United States Patent

Hepner et al.

[15] 3,701,843

[45] Oct. 31, 1972

[54] MATRIX AMPLIFIER NETWORK WITH NOVEL D-C SET-UP ARRANGEMENT

[72] Inventors: Charles F. Hepner; George J. Tzakis, both of Chicago, Ill.

[73] Assignee: Zenith Radio Corporation, Chicago, Ill.

[22] Filed: Oct. 5, 1970

[21] Appl. No.: 77,769

[52] U.S. Cl. ......................... 178/5.4 SD, 178/5.4 MA

[51] Int. Cl. ................................................ H04n 9/50

[58] Field of Search ..... 178/5.4 MA, 5.4 SD, 5.4 CK, 178/5.4 AC, 5.2 A; 330/69, 30 D, 25

[56] References Cited

UNITED STATES PATENTS

| | | |
|---|---|---|
| 3,180,928 | 4/1965 | Rennick .............. 178/5.4 MA |
| 3,506,776 | 4/1970 | Rennick ................ 178/5.4 SD |

*Primary Examiner*—Robert L. Richardson
*Assistant Examiner*—John C. Martin
*Attorney*—John J. Pederson and Donald B. Southard

[57] ABSTRACT

A matrix amplifier network, preferably of a monolithic configuration, having three transistorized differential amplifiers and a common bias arrangement to maintain conduction at the same current level. Means are included to operate the differential amplifiers in push-pull fashion to develop the desired primary color control signals. The matrix amplifier network further includes a novel set-up arrangement incorporating respective voltage dividers interconnected in a manner to develop a d-c control potential for establishing and maintaining reference black level notwithstanding variations in the d-c output levels of the associated chroma demodulators as frequently encountered in integrated circuit arrangements between unit-to-unit, or as may otherwise result from receiver power supply or line voltage fluctuations.

13 Claims, 6 Drawing Figures

Inventors
Charles F. Hepner
George J. Tzakis
By [signature]
Attorney

Inventors
Charles F. Hepner
George J. Tzakis
By [signature]
Attorney

Inventors
Charles F. Hepner
George J. Tzakis
By [signature]
Attorney

Inventors
Charles F. Hepner
George J. Tzakis
By J.B. Southard
Attorney

MATRIX AMPLIFIER NETWORK WITH NOVEL D-C SET-UP ARRANGEMENT

BACKGROUND OF THE INVENTION

The present invention is addressed to a matrix amplifier network especially suited for monolithic integration and which includes a novel d-c set-up arrangement for establishing reference black level, unaffected by variations in demodulator output signals or other factors.

Matrix amplifier networks are of course known in the art and are commonly used, for example, in processing of the chrominance signal to develop respective primary color control signals required for a three gun shadow-mask type of color-reproducing device. A particular color-difference signal is matrixed with a portion of the luminance signal to derive each of the primary color control signals as applied to the appropriate electrodes of the color image reproducer. The required matrixing may be accomplished within the image reproducer itself, or external thereto in a separate matrix network arrangement. It is this last-mentioned type of external matrix to which the present invention is particularly addressed.

Amplifiers for accomplishing external matrixing have been proposed in both discrete component and monolithic form. There is, however, a distinct trend today to microcircuitry in view of various attendant advantages. One such monolithic matrix amplifier arrangement related in certain of its more general aspects to the subject matter at hand is set forth in a co-pending application, Ser. No. 853,156, filed Aug. 26, 1969, now U.S. Pat. No. 3,619,486, in behalf of George J. Tzakis, and assigned to the same assignee of the present invention. As therein disclosed, the matrix amplifier network not only accomplishes external matrixing of the required primary color control signals, but further facilitates the application of blanking pulses to the image reproducer for retrace blockout. Other advantages noted are in reductions in voltage and power level requirements as well as uniformity of output and overall d-c stability.

Such matrix amplifier network, however, as well as other prior art arrangements in monolithic or discrete form, assumes substantially fixed reference conditions, i.e., the respective outputs of the associated demodulators supplying color-difference signals thereto are considered as being at predetermined, fixed output levels. The fact is that such outputs representing d-c quiescent operating levels can and frequently do vary, particularly with respect to those in monolithic form. It has been found that the reference outputs of such monolithic demodulators can vary as much as 5 volts from unit to unit, including nominal power supply and line fluctuations. Such differences in demodulator outputs are necessarily amplified by the active elements within the matrix amplifier network itself and resulting, if compensation is not otherwise provided, in large variations at the control electrodes of the image reproducer with reference to established d-c set-up voltages.

Accordingly, it is an object of the present invention to provide an improved matrix amplifier network in monolithic form for a color television receiver.

A more particular object of the present invention is to provide an improved matrix amplifier network of the foregoing type having provisions to effect and maintain proper d-c set-up voltage parameters for the image reproducer notwithstanding variations in the d-c levels of the associated demodulators which form the inputs to the matrix amplifier network.

Still another object of the present invention is to provide an improved matrix amplifier network of the foregoing type wherein a d-c control signal may be derived from respective color-difference signals, which control signal itself is nevertheless entirely free of color-difference information, so as to permit operation of the matrix amplifier network from an unregulated, off-the-line power supply and with demodulators exhibiting variations in quiescent operating levels.

SUMMARY OF THE INVENTION

A matrix amplifier network, constructed in accordance with the present invention, develops push-pull color control signals from the luminance and three color-difference signals collectively representing a color image. The amplifier network comprises three separate differential amplifiers each including a plurality of transistors interconnected in a Y-type circuit configuration. Means are provided for applying the luminance signal to the base electrode of one of a pair of transistor devices forming the respective differential amplifiers, while the color-difference signals are applied to the base electrode of the other of such transistor pair. The polarities of these applied signals are such as to develop at the output of the three differential amplifiers push-pull control signals representing the three color fields, respectively, of the image being translated.

In addition, a resistive voltage-divider network is included in the circuitry of each differential amplifier which, when suitably interconnected, forms a novel set-up matrix arrangement for establishing and maintaining reference black level for the image reproducer despite variations in the demodulator output levels or because of power supply or line fluctuations that may occur from time to time. The novel set-up matrix arrangement derives an appropriate d-c control signal by combining a portion of the respective color-difference signals, which d-c control signal is nevertheless free of any color-difference information itself. The compensation technique is accomplished by applying the derived d-c control voltage to each differential amplifier on the side opposite to the side connected to an associated demodulator, thereby effecting a cancellation of the common mode d-c signal within the respective differential amplifiers as well as any d-c drift that may otherwise be present with respect to the associated chroma demodulator devices themselves.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENTS

Figure 1:
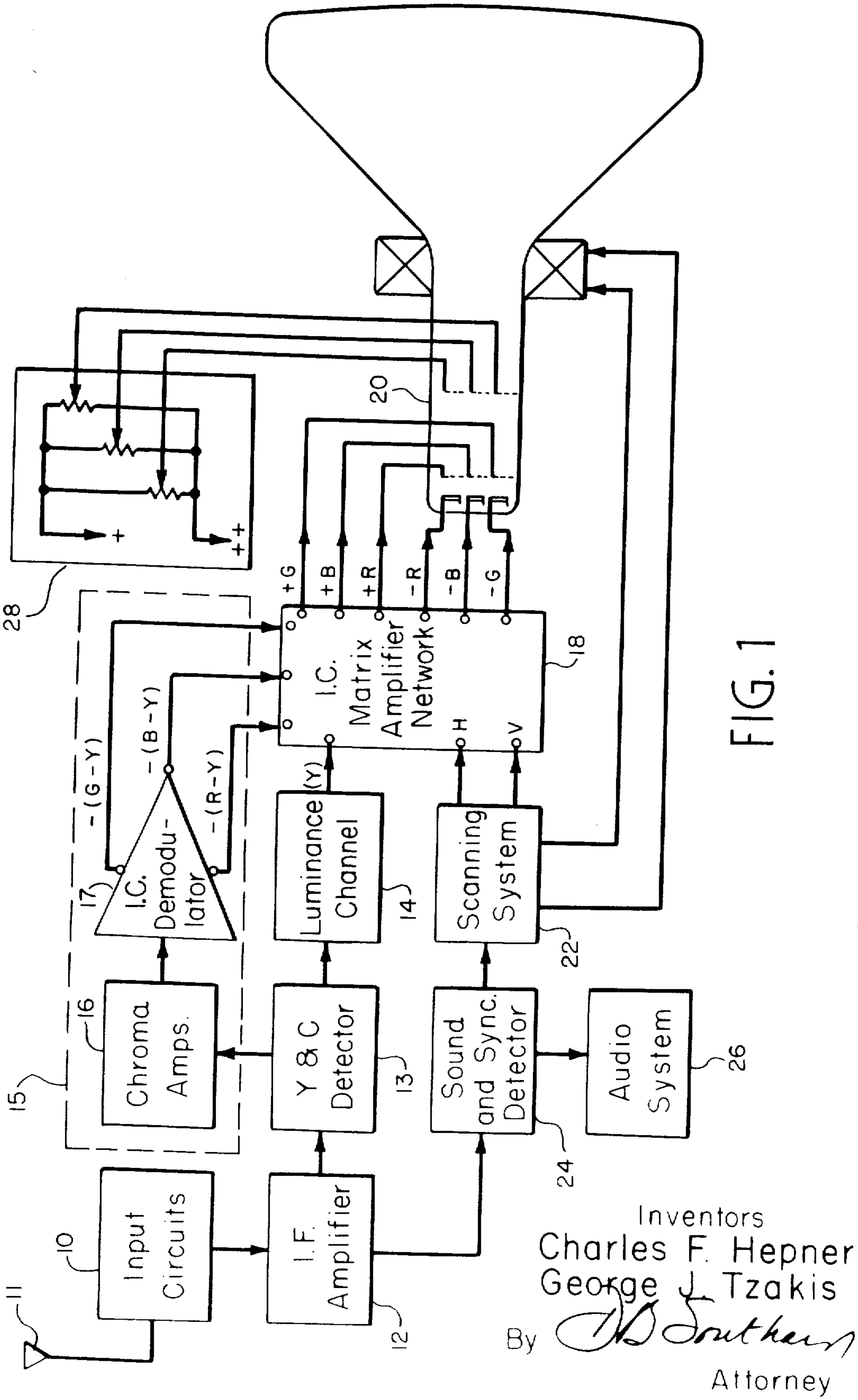
FIG. 1 is a block representation of a color television receiver which may employ a matrix amplifier network for low level tracking in accordance with the present invention.

Aside from the particulars of the amplifier employed for external matrixing, the receiver represented in FIG. 1 is conventional as to both structure and operation; therefore, its description will be brief. It comprises input circuitry 10 to which an antenna 11 is coupled and this circuitry will be understood to comprise radio-frequency selectors, a tunable heterodyning oscillator, as well as the first detector or oscillator modulator which may be adjusted by customer controls to select a desired color program signal which is processed in unit 10 to an intermediate-frequency signal. After amplification in an intermediate-frequency amplifier 12, it is applied to a luminance and chrominance (Y & C) detector 13 which may also include an emitter follower as an output stage. One output of detector 13 is delivered to a luminance processing channel 14 and another output is supplied to a chrominance processing channel 15. The latter may include suitable stages of chroma amplification, as identified at 16, and also a chroma demodulator, such as indicated at 17, preferably in monolithic form, with or without a matrixing network but, in any event, arranged to develop three color-difference signals for application to an external matrixing amplifier network, such as identified at 18. It is this matrix amplifier network to which the invention is particularly directed.

Matrix amplifier 18 supplies color control signals to a color image reproducer 20 such as the three-gun, shadow-mask type. It will be observed that two connections are indicated from amplifier network 18 to reproducer 20 for each of the R, G and B primary color control signals. This is intended to represent the application of push-pull control signals for each such primary color, one being applied to the cathode and the other applied to the first control grid of an assigned one of the three electron guns of the shadow-mask color tube. These primary color control signals control each of three beams of the color tube so that as those beams scan the screen in a repeating series of parallel lines, they develop three color fields of the image resulting in image reproduction in simulated natural color. Scanning of the screen by these beams is under the control of the usual scan system 22 which includes line or horizontal as well as the field or vertical systems controlled by the synchronizing components of the received signal developed in a sound and sync detector 24 to which the received signal of intermediate-frequency form is delivered from amplifier 12. A second output of detector 24 is supplied to an audio system 26 so that the sound portion of the broadcast is reproduced concurrently with image reproduction. A high-voltage arrangement such as shown at 28 is also included having adjustable elements connected to respective second control grids of the image reproducer 20 to insure the three electron guns are properly cut off at the desired potential as applied to the respective cathodes to define reference black level.

As stated above, aside from the particulars of matrix amplifier network 18, such a receiver is well understood and should require no further detailed description. It is for this reason that the various accessories such as power supply, dynamic convergence and the like, which do not constitute a part of the present invention have not been shown in the drawings nor discussed. Particular attention may now be directed to the circuitry of matrix amplifier network 18.

Figure 2:
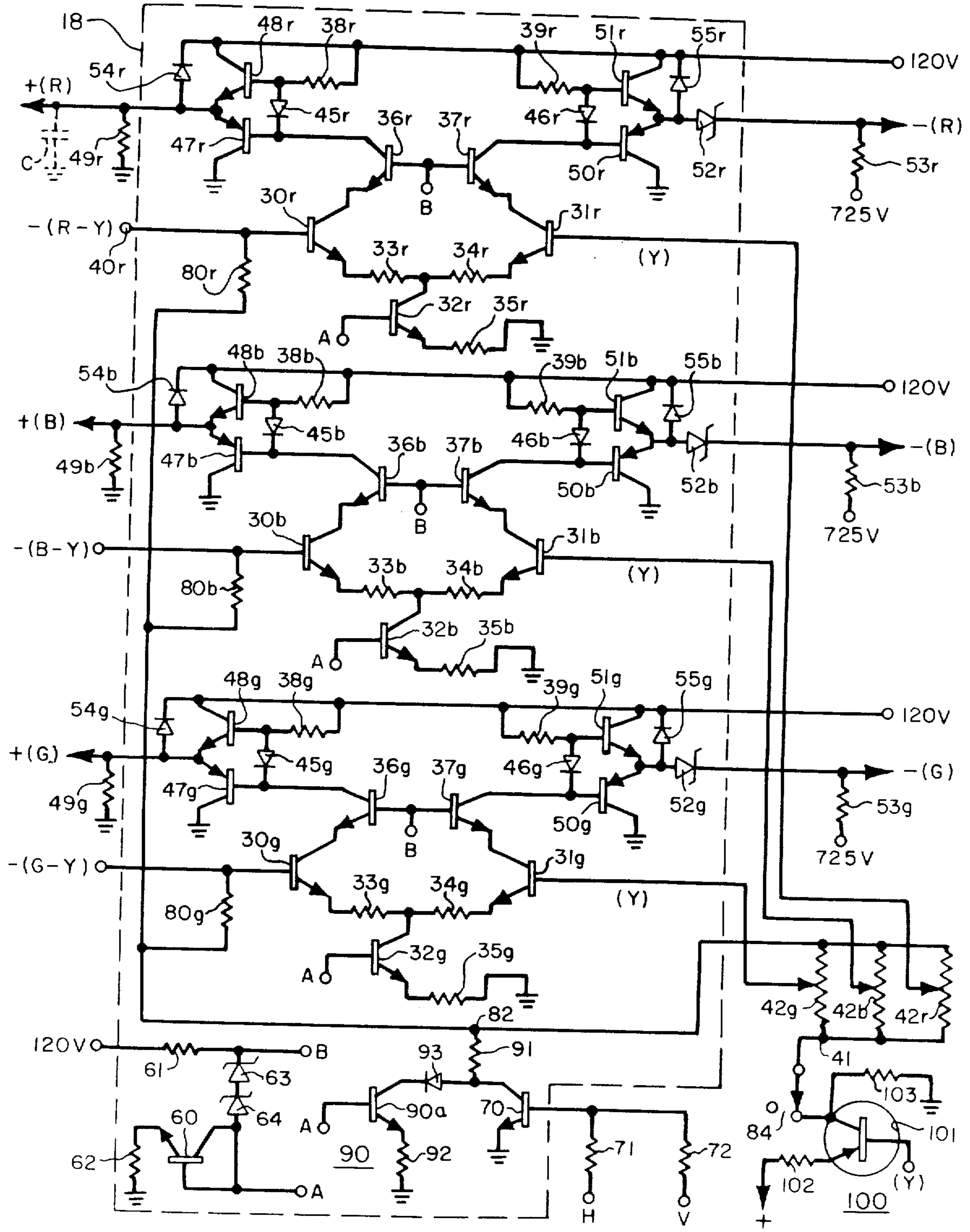
FIG. 2 is a partial schematic diagram of a representative form of such a matrix amplifier network including the self-regulating d-c set-up arrangement for establishing and maintaining reference black level for the image reproducer.

The matrix amplifier network 18 shown in detailed schematic form in FIG. 2 is a microcircuit of the monolithic type having transistors, diodes and resistors which, for the most part, are built on a single substrate and enclosed by suitable encapsulation. The enclosed components are those contained within broken-line rectangle 18 and those components beyond the limits of that rectangle are outboarded, so to speak. That is to say, they are components that are physically exterior of the monolithic structure, being connected thereto in accordance with the circuit patterns represented in the figure.

The matrix amplifier 18 has, as its major components, three differential amplifiers, a means for grey scale tracking, power supply, blanking circuit, and a set-up arrangement for establishing reference black level, which will be considered seriatim. The differential amplifiers are essentially identical, one being provided for each of the primary colors. Their various components are designated by the same reference numeral and are distinguishable from one another by the letter *g*, *b* or *r*. For convenience, only the red amplifier will be described. It includes three transistors **30*r*, 31*r*, 32*r* individually having collector, base and emitter electrodes and arranged in a Y-type circuit configuration with the collector-emitter path of one, constituting a high impedance component, included in the collector-emitter paths of both of the remaining two. More specifically, the collector-emitter path of transistor 32*r* is common to the collector-emitter paths of transistors 30*r*, 31*r*. The emitters of transistors 30*r*, 31*r* are connected by resistors 33*r* and 34*r* while the junction of those resistors connect to the collector of transistor 32*r*. The emitter of this transistor connects to ground through an emitter resistor 35*r***.

Each differential amplifier has two additional transistors **36*r* and 37*r*** having base, collector and emitter electrodes with their collector-emitter paths connected to the collector-emitter paths of transistors 30r and 31r, respectively, to define therewith cascode amplifiers. A diode 45r and a resistor 38r serially connected between the 120 V potential source and the collector of transistor 36r forms the load for the latter while in similar respect, a diode 46r and a resistor 39r serve as the load for transistor 37r. Diodes 45r and 46r are included to eliminate potential non-responses or dead areas between conduction points of their associated transistors, i.e., transistors 47r, 48r or transistors 50r, 51r.

The signals to be matrixed are the color-difference signals developed by color demodulator 17 of chrominance channel 15 and the luminance signal obtained from luminance channel 14. Returning to a consideration of the illustrative red differential amplifier, the red color-difference signal −(R−Y) is applied through an input terminal 40r to the base of transistor 30r. The luminance signal (Y) is applied by transistor amplifier stage 100 to an input terminal 41, which connects with potentiometers, or adjustable voltage dividers, 42r, 42b, 42g arranged in parallel and returned to ground through resistances 91, 92 and a diode 93 connected in series through the collector-emitter path of a transistor 90, as indicated. The adjustable tap of voltage divider 42r connects with the base of its assigned transistor 31r. Similar connections from the remaining voltage dividers 42b and 42g complete a low level tracking arrangement through which the three differential amplifiers may be adjusted relative to one another.

The relative polarities of the color-difference signal applied to the base of transistor 30r and the luminance signal applied to the base of transistor 31r are related to develop at the collector loads 38r and 39r primary color control signals in push-pull form. A positive polarity primary color control signal is derived from collector load 38r through a complementary symmetry type of emitter-follower arrangement comprised of a PNP transistor 47r and an NPN type of transistor 48r. The base electrodes of these transistors interconnect through the diode 45r in the manner indicated. The emitters are connected together and the collector of transistor 48r connects to a 120V source while the collector of transistor 47r is returned directly to ground. The emitters of transistors 47r, 48r are connected to ground through an emitter load 49r and the positive polarity red primary color control signal +(R) is supplied from emitter load 49r to grid one, or first control grid, of the gun of image reproducer 20 that is assigned to develop the red color field of the image being translated. A similar emitter-follower arrangement comprising transistors 50r and 51r connects with the collector circuit of transistor 37r to derive the negative polarity red primary color control signal −(R). The takeoff of this last signal includes a Zener diode 52r which connects to a potential source of approximately 725V through a dropping resistor 53r and provides means for establishing a substantially constant predetermined d-c potential difference between the two output connections of the differential amplifier. This potential difference is the operating bias that is to be established between the first grid and cathode of the electron gun of the picture tube to which the particular differential amplifier connects. Diodes 54r and 55r connected across the collector-emitter of transistors 48r and 51r, respectively, are intended as arc suppressors and are effective to clamp the transistor collector electrodes at a safe limit to protect against transistor breakdown in the event an arc transient occurs in the electrode system of the red gun. Necessary bias potentials for the transistors of the differential amplifier are obtained from a power supply presently to be described by connections between terminals of corresponding designation such as A—A and B—B.

A suitable power supply comprises a transistor 60 operated as a diode and connected through a resistor 61 to the 120V source of potential. The emitter of this transistor connects to ground through an emitter load 62. The base and collector are interconnected and through their connection to terminal A serve as a common bias means for establishing the same collector current in each of transistors 32r, 32b and 32g of the three differential amplifiers. A pair of Zener diodes 63 and 64 are connected in series between resistor 61 and the base-collector junction of transistor 60. The junction of Zener diode 63 and resistor 61 thus serves as the bias terminal B required for the differential amplifiers, as indicated.

In order to achieve retrace blockout, the arrangement of FIG. 2 further comprises means for applying to at least one of the transistors of each of the differential amplifiers, other than the particular one which has its collector-emitter path in common to the remaining two, a periodically recurring retrace signal of such polarity as to introduce retrace blanking components into the push-pull control signals. As shown, the retrace signal is applied to the same transistor of each differential amplifier as the luminance signal; for the one illustrative stage, this is transistor 31r. The application of the retrace signals is through a transistor 70, having its collector connected to the junction common to resistance 91 and diode 93. The emitter of transistor 70 is returned directly to ground. Blanking pulses occurring at the line and field rates are available in scan system 22 and may be obtained, by way of illustration, from the terminals designated H and V and applied to similarly designated terminals of matrix amplifier 18. These terminals connect through resistors 71 and 72 to the base of transistor 70.

In describing the operation of the arrangement of FIG. 2, consideration will be given initially to the differential amplifier including transistor 30r, 31r and 32r which develops red primary color control signals in push-pull. The negative red color-difference signal −(R−Y) is applied to input terminal 40r concurrently with the application of luminance signal (Y) to the base of transistor 31r. Each applied signal is amplified and translated to the output circuits of both sides of the differential amplifier, considering transistor 30r to be on one side and transistor 31r to be on the other side of the red amplifier. A phase reversal is experienced by the color-difference signal in arriving at the collector of transistor 36r and, therefore, it appears in the collector circuit of that transistor as a signal (R−Y). At the same time, the luminance signal (Y) is translated without phase reversal from the base of transistor 31r to the collector of transistor 36r where it combines with the color-difference signal and develops the positive red primary color control signal + (R) for application to the control grid of the red electron gun of the color picture tube. Similar conditions exist in the other side of this same differential amplifier differing, however, in the manner of phase reversals. In this instance, the luminance signal (Y) is reversed in phase in its translation to the collector of transistor 37r where it appears as a negative signal −(Y). The color-difference signal −(R−Y) is translated from the base of transistor 30r to the collector of transistor 37r without a phase reversal where it combines with the luminance signal −(Y) and yields the negative red primary color control signal −(R) which is applied to the cathode of the red electron gun of the picture tube. There is a continual bleeder current or drain through Zener diode 52r which may establish a voltage level of approximately 85 volts, causing the push-pull red primary color control signals to have this amount of d-c potential difference, serving as a grid-to-cathode bias for the red gun.

In the second differential amplifier comprising transistors 30b, 31b and 32b, the same type of signal translation and superpositioning takes place. Consequently, push-pull forms of the blue primary color control signal are applied from the two outputs of this amplifier to the control grid and cathode of the electron gun of the picture tube that is assigned to the blue field. In essentially identical fashion, the remaining differential amplifier which includes transistors 30g, 31g and 32g develops the green primary color control signal in push-pull form for application to the control grid and cathode of the gun assigned to green in the color picture tube. Since this family of push-pull color control signals are developed concurrently and during the scanning of the image screen by the three beams of the tube, the image is synthesized in simulated natural color.

During retrace scanning intervals, all three electron beams of the color tube are cut off. During line retrace, for example, a horizontal pulse of positive polarity is applied to the base of transistor 70 where it is clipped on both sides and appears with opposite phase at the collector to be added to the luminance input at the base of transistor 31r. This pulse occurs with negative polarity in the output of transistor 36r and is, therefore, of the correct polarity for retrace blockout since this signal is applied to the control grid of the red electron gun of picture tube 20. Concurrently, the same retrace pulse appears with positive polarity in the collector or output of transistor 37r and, therefore, is appropriate as a retrace blockout pulse for application to the cathode of the red electron gun to which the output of this particular transistor is delivered. In similar fashion, retrace blockout occurs on each of the other two guns of the shadow mask tube during horizontal retrace and in precisely the same way, on all three guns during vertical or field retrace.

The complementary symmetry type of emitter followers, formed by transistors 47r, 48r and 50r, 51r, avoid distortion due to diagonal clipping. This phenomenon may otherwise occur because of the capacitance C presented by the control grid of the image reproducer, and shown in FIG. 2 in broken-construction line to distinguish the same from a capacitor in discrete form. In conjunction with resistor 49r, such capacitance forms a time constant network in which clipping and distortion may be experienced unless a discharge path of sufficiently short time constant is provided therefor. Normally, transistor 48r is conductive, providing a fast charge path, but its companion transistor 47r is non-conductive. In the presence of a sharp negative-going signal excursion transistor 48r becomes less conductive to where the discharge time constant of the network 49r and capacitance C is increased and distortion or signal clipping results. This is avoided with the complementary symmetry arrangement because the companion transistor 47r tends to be rendered conductive in response to the negative-going signal excursion and the parameters of the circuit are adjusted so that conduction is established in transistor 47r when transistor 48r has decreased its conductivity to the point where clipping could ensue. The similar emitter-follower comprised of transistors 50r, 51r, operates in essentially the same way to avoid clipping that is otherwise attributable to the capacitance associated with the cathode of the red gun of tube 20.

The matrix amplifier network 18 includes a novel set-up arrangement as an integral part of its integrated circuitry. Such set-up arrangement not only permits the establishment of the correct d-c voltage parameters required for the image reproducer 20, and hence reference black level, but is effective to maintain the same over a range of output d-c levels applied by the associated demodulator stage 17 developing the respective color-difference signal information and, further, despite any fluctuations within given limits that may occur in the power supply or line voltage parameters.

This novel set-up arrangement comprises, inter alia, respective voltage dividers in the circuitry of each of the differential amplifiers which, in the preferred embodiment, are suitably interconnected with a constant current source 90 to form an active matrix 83 wherein a d-c control voltage is derived by combining a portion of the three color-difference signals. This control voltage is utilized to selectively control the conduction levels of certain of the transistors forming the respective differential amplifiers.

The voltage-dividers are formed by the resistors 80r, 80b and 80g connected between a respective base electrode of the transistors 30r, 30b and 30g to which the color-difference signals are selectively applied, and a common junction identified at 82. Junction 82 is coupled to a constant current source formed by a transistor 90a having its base electrode connected to the controlled bias source A and its collector-emitter circuit connected between the junction 82 and ground through series limiting resistances 91 and 92 and a diode 93. Resistance 91 further serves as the load across which the horizontal and vertical blanking pulses are developed during retrace intervals. Further, diode 93 provides a blocking action upon conduction of transistor 70 during blanking pulse intervals.

Figure 3:
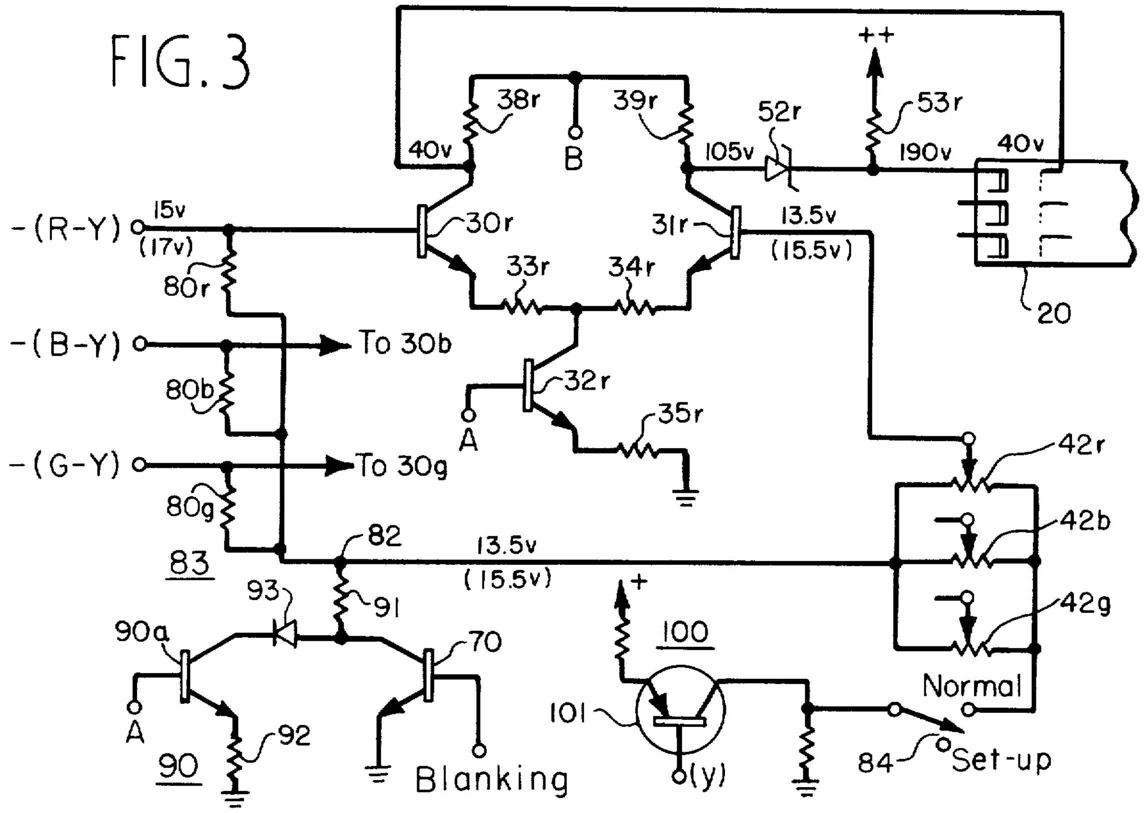
FIG. 3 is a partial schematic diagram of a representative differential amplifier and set-up matrix circuitry illustrating the maintenance of reference black level over a range of input signal level variations that may result from different demodulator units and/or power supply and line fluctuations.

Accordingly, and as best seen in FIG. 3, the matrix circuit 83, formed by associated bleeder resistors 80r, 80b and 80g and the constant current source 90, permits a selective portion of each of the respective color-difference signals to be fed to the common junction point 82 where they are combined, or matrixed, to form a d-c control voltage or signal of particularized value. This d-c control signal is applied to one side of the potentiometers 42r–42b–42g, i.e., the side common to junction 82, with the luminance signal Y being applied to the other side of the potentiometers through a receiver service switch 84 connected to the luminance amplifier stage 100, and in turn from the movable contact arms of the potentiometers to the respective base electrodes of transistors 31*r*, 31*b* and 31*g*, as shown. During normal operation, the luminance signal Y from amplifier stage 100 is applied to transistors 31*r*, 31*b* and 31*g* through switch 84 to effect appropriate matrixing action therein with the selectively applied color-difference signals whereby the primary control signals are developed and applied to the image reproducer 20, as previously described. The potentiometers 42*r*, 42*b* and 42*g* are selectively adjustable to effect the transfer of the appropriate level of luminance signal to each of transistors 31*r*, 31*b* and 31*g* and thereby accomplish correct grey scale tracking in known manner.

For effecting proper set-up conditions, however, the service switch 84 must initially be actuated to its "set-up" position to interrupt the application of the luminance signal to the respective base electrodes of transistors 31*r*, 31*b* and 31*g* and the variable control (not shown) for determining the level of chroma signal as applied from the chroma amplifiers to the demodulators 17 is adjusted for minimum signal, or minimum color. Accordingly, only the quiescent d-c operating levels of the demodulators 17 are present and thus applied to the respective input base electrode of transistors 30*r*, 30*b* and 30*g*. However, a portion thereof is also applied to the junction terminal 82 through the resistors 80*r*, 80*b* and 80*g* of the set-up matrix circuit 83. The combined d-c control voltage so developed at junction 82 is in turn applied to the respective input base electrodes of transistors 31*r*, 31*b* and 31*g* through potentiometers 42*r*–42*b*–42*g*. There is very little voltage drop across potentiometers 42*r*–42*b*–42*g* since the current level therethrough under these operating conditions is quite low. Accordingly, the particular setting of the control arms of potentiometers 42*r*–42*bi*–42*g* is rendered essentially immaterial during set-up procedures. In any event, the control voltage as applied to the input base electrodes of the transistors 31*r*, 31*b* and 31*g* determine the conduction level thereof and in turn the d-c voltage as applied to the appropriate cathode electrodes of the image reproducer 20 to establish the parameters for the desired reference black level. As an example, it may be assumed that a 15 volt quiescent level for the R–Y signal as applied to the input base electrode of transistor 30*r* of the differential amplifier developing the red primary control signal effects a conduction level therefor resulting in approximately 40 volts being developed at its collector electrode, as indicated, and thus applied to the red control grid of image reproducer 20. Under these induced operating conditions, the values for the circuit elements of the remaining circuitry are selected so that a control voltage of, say for example, approximately 13.5 volts is developed at junction 82, which in turn effects a conduction level for transistor 31*r* sufficient to maintain its collector electrode at about 105 volts. To say it somewhat differently, the respective output voltages developed at collector electrodes are determined by the difference in control voltage as applied to the base electrodes of the associated transistors of the differential amplifier, in this case, 15 volts minus 13.5 volts, or a 1.5 volt differential. Additionally, since Zener diode 52*r* exhibits a breakdown voltage of some 85 volts, the voltage as applied to the red cathode of image reproducer 20 is approximately 190 volts, thereby resulting in d-c cut-off, or reference black level, at the desired 150 volt level.

This reference level remains substantially fixed and unvarying notwithstanding subsequent changes in the input signal levels to the respective differential amplifier stages, such as for example, variations in the d-c output levels of the associated demodulators, whether the result of unit-to-unit differences, or the result of fluctuations in the power supply or line voltage parameters. This can be more readily appreciated by again referring to FIG. 3 and assuming an increase in the input signal level for the transistors 30*r*, 30*b* and 30*g* to, say, 17 volts. The higher levels would normally produce a higher conduction state for transistor 30*r*. However, the higher level of applied signal at the base electrode of transistor 30*r* also produces a higher signal at the base electrode of transistor 31*r* through matrix circuit 83. It will be appreciated that if the same differential between applied voltages at the respective base electrodes of transistors 30*r* and 31*r* is effectively maintained, as previously experienced, then the output voltages at the collector electrodes thereof will also remain the same as previously exhibited. This is precisely the case, and the collector voltages remain the same.

Ordinarily, the higher input level (the assumed 17 volt level, as compared to the initially assumed level of 15 volts) would experience a slightly greater voltage drop through resistors 80*r*, 80*b* and 80*g* to junction 82. That is, whereas the 15 volt level at respective base electrodes of transistors 30*r*, 30*b* and 30*g*, would effect a voltage drop across matrix resistors 80*r*, 80*b* and 80*g* to develop approximately 13.5 volts at junction 82, (a 1.5 volt differential) the higher 17 volt level would produce a correspondingly greater voltage drop across resistors 80*r*, 80*b* and 80*g*. Instead of a 1.5 volt differential, which would effect approximately 15.5 volts at junction 82, the derived d-c control voltage would be expected to be something on the order of 15.3 volts (1.7 volt differential). However, the constant current source 90 coupled to junction 82 effectively maintains the current "constant" such that the differential is maintained at the previous 1.5 volts, or in this instance, 17 volts less than 1.5 volt differential, or 15.5 volts. The developed 15.5 volts at junction 82 is substantially applied as before to the base electrode of transistor 31*r*, and since such differential voltage between the latter and the base electrode of transistor 30*r* remains the same, the respective collector voltages likewise remain unchanged. Accordingly, the potential difference between cathode and first control grid of the red gun of image reproducer 20 remains at the desired 150 volt level, notwithstanding there has been a 2 volt change in the quiescent d-c operating level of demodulators 17. If the differential voltage between base electrodes of transistors 30*r* and 31*r* had not been held fixed, there could have been a change on the order of some 70 volts in the cut-off point, or reference black level, for the image reproducer 20. This is on the basis that differential amplifier comprising transistors 30*r*, 31*r* and 32*r* exhibits a nominal gain of 35. A 2 volt change at the base electrode of transistor 30*r* without a corresponding change at the base electrode of transistor 31*r* effects conduction levels therefor whereby the output voltage at the collector electrode of transistor 30*r* drops some 35 volts (two volts times the gain of transistor 30*r*, or 17.5) while the output voltage at the collector electrode of transistor 31*r* rises a corresponding 35 volts. However, the respective conduction levels of transistors 30*r* and 31*r* do in fact remain the same, because the differential voltage between respective base electrodes thereof remains the same through the action of matrix circuit 83, and reference black level rendered fixed and unchanged.

It will of course be understood that a corresponding compensating action occurs as a result of a decrease in input level to transistors 30*b* and 30*g* and desired cut-off point is likewise effectively maintained for the blue and green electron guns as well in the manner as previously described. Accordingly, the matrix amplifier network 18 as a whole is rendered impervious to the otherwise deleterious effects of changes in input signal levels, from whatever source, as applied to the respective differential amplifiers and the network may be conveniently and readily operated with any associated demodulator units having d-c operating levels within given limits. The network 18 may of course be operated from an unregulated, off-the-line power supply. This is also true for the demodulators 17 themselves. Reference black level, once correctly established, remains at the desired level. No further corrective action or circuit adjustments are necessary or required.

Figure 3A:
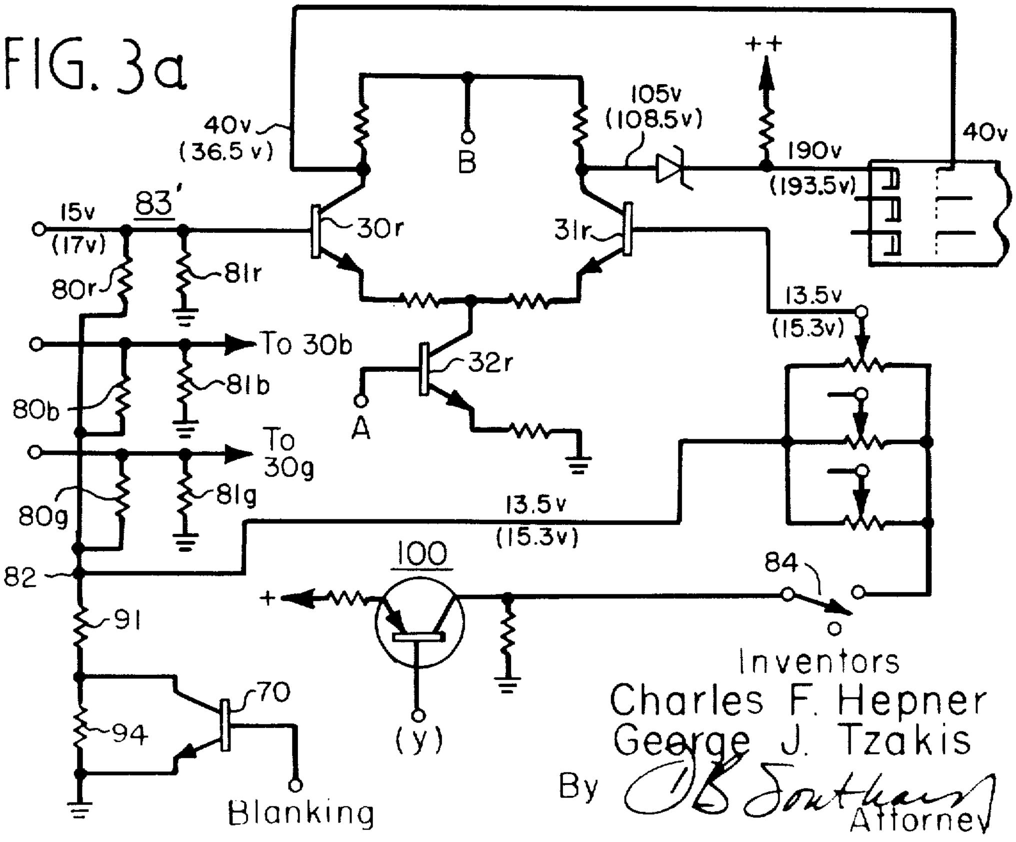
FIG. 3*a* represents a modification of the embodiment of FIG. 3 utilizing an all-resistive set-up matrix arrangement.

If the components necessary to form the constant current source 90 are deemed unattractive economically or otherwise, a relatively simple modification to matrix circuit 83 may be conveniently and readily effected, as indicated in FIG. 3*a*. Transistor 90*a* and diode 93 are eliminated and a resistance 94 substituted for resistance 92, as shown. Blanking pulses are developed across resistance 94 from transistor 70 and applied through resistance 91 and portions of potentiometers 42*r*, 42*b* and 42*g* in the manner as previously described. In addition, a resistance is added from the base electrode of each of transistors 30*r*, 30*b* and 30*g* to a source of reference potential, or ground. Such resistances are identified at 81*r*, 81*b* and 81*g*, respectively.

In operation, the assumed 15 volt input level to transistor 30*r* produces the same 13.5 volt level at junction 82, which when applied to the input to transistor 31*r*, produces the same output collector voltages of 40 and 105 volts. The action of Zener diode 52*r* raises the voltage as applied to the associated cathode of image reproducer 20 to 190 volts, or a resultant potential between cathode and control grid of approximately 150 volts (190 volts less 40 volts.) However, if the assumed 15 volt input level is increased to the 17 volt example, the voltage developed at junction 82 will rise in this instance to about 15.3 volts. That is, if 13.5 volts is developed at junction 82 from a 15 volt input level to the respective differential amplifier, it means a 10 percent voltage drop occurs across resistances 80*r*, 80*b* and 80*g*. The same percentage of voltage drop at an input level of 17 volts represents 1.7 volts, and the voltage developed at junction 82 will be 15.3 volts. Whereas a 1.5 volt differential is exhibited between the respective inputs of transistors 30*r* and 31*r* at a 15 volt d-c operating level for the receiver demodulators, a differential of approximately 1.7 volts results therebetween at a 17 volt operating level. The change of some 0.2 volts (1.7 volts less 1.5 volts) means a final variation of some 7 volts in the potential as applied to the cathode and first control grid of the red gun in image reproducer 20. The voltage at the collector of transistor 30*r* drops, or decreases, some 3.5 volts (0.2 volts times 17.5 gain factor for transistor 30*r*) to 36.5 volts from the previous 40 volts and the voltage at the collector of transistor 31*r* rises a corresponding 3.5 volts to 108.5 volts from the previous 105 volts. The cut-off point for the red gun of image reproducer 20 will occur at approximately 157 volts (193.5 volts at the cathode less 36.5 volts at the control grid) instead of the previous 150 volts (190 volts less 40 volts). However, the indicated 7 volts change is well within nominal operating parameters from a practical viewpoint and in any event represents only a 10 percent change from the some 70 volts which would otherwise result if the set-up matrix circuit 83 were not included.

Figure 5:
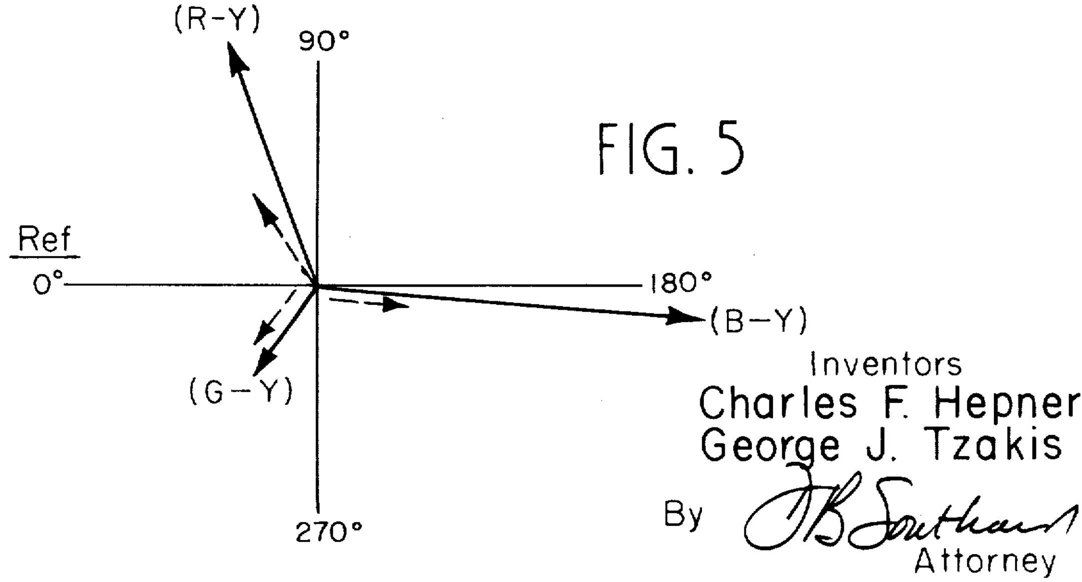
FIG. 5 is a graphic representation of the derived color-difference signals useful in understanding one aspect of the invention.

An attractive feature of the present invention is the fact that the d-c control voltage derived by the set-up matrix circuitry 83 or 83′ is substantially free of any color-difference information, notwithstanding the same is comprised of respective portions of the three color-difference signals. This feature is accomplished by the particular circuit arrangement of the set-up matrix and particularized circuit values for the associated components thereof whereby the color components themselves are cancelled out and only a substantially direct-current, or d-c, component remaining. This may be more readily appreciated by reference to FIG. 5. As is known in the art, the demodulator unit (not shown) developing the B-Y color-difference information will customarily exhibit the largest gain, the demodulator unit developing the R-Y color-difference information the next largest, and the unit developing G-Y color-difference information the smallest, as represented graphically by the solid-line vectors in FIG. 5. The relative positions of such vectors are of course representative of the respective demodulation angles along which the demodulator units operate with respect to a reference, such as the color burst signal indicated at zero degrees. By appropriate selection, however, of the circuit values for resistors 80*r*, 80*b* and 80*g*, the magnitudes of the respective signal levels from such demodulator units as applied to junction 82 may be made substantially equal, as indicated by the vectors in dotted-line in FIG. 5. Accordingly, equal magnitudes together with the inherent phase relationships (as indicated) result in an effective cancellation of the individual color components in the derived control signal with only a d-c component remaining substantially free of any color-difference signal information.

The circuit values for the matrix set-up arrangement 83 found to provide satisfactory operation are as follows:

| | |
|---|---|
| Resistor 80*r* | 17,400 ohms |
| Resistor 80*b* | 36,100 ohms |
| Resistor 80*g* | 4,880 ohms |
| Resistor 91 | 10,000 ohms |
| Resistor 92 | 8,000 ohms |
| Resistors 81*r*, 81*b*, 81*g* (if matrix circuit 83′ used) | 5,000 ohms |

Additionally, a representative set of circuit values for the remaining components parts for one of the differential amplifiers of FIG. 2 found to provide satisfactory operation is set forth below. It is to be understood that such circuit values, where applicable, are the same for the remaining differential amplifiers.

| | |
|---|---|
| Resistors 33r, 34r | 430 ohms |
| Resistor 35r | 870 ohms |
| Resistors 38r, 39r | 15,000 ohms |
| Resistor 49r | 100,000 ohms |
| Resistor 53r | 330,000 ohms |
| Potentiometer 42r | 3,000 ohms |
| Resistor 61 | 15,800 ohms |
| Resistor 62 | 870 ohms |
| Resistors 71, 72 | 100,000 ohms |
| Resistors 94 | 13,400 ohms |
| Zener diode 52r | approx. 85 V breakdown voltage |
| Zener diodes 63, 64 | approx. 6.9 V breakdown voltage |

Figure 4:
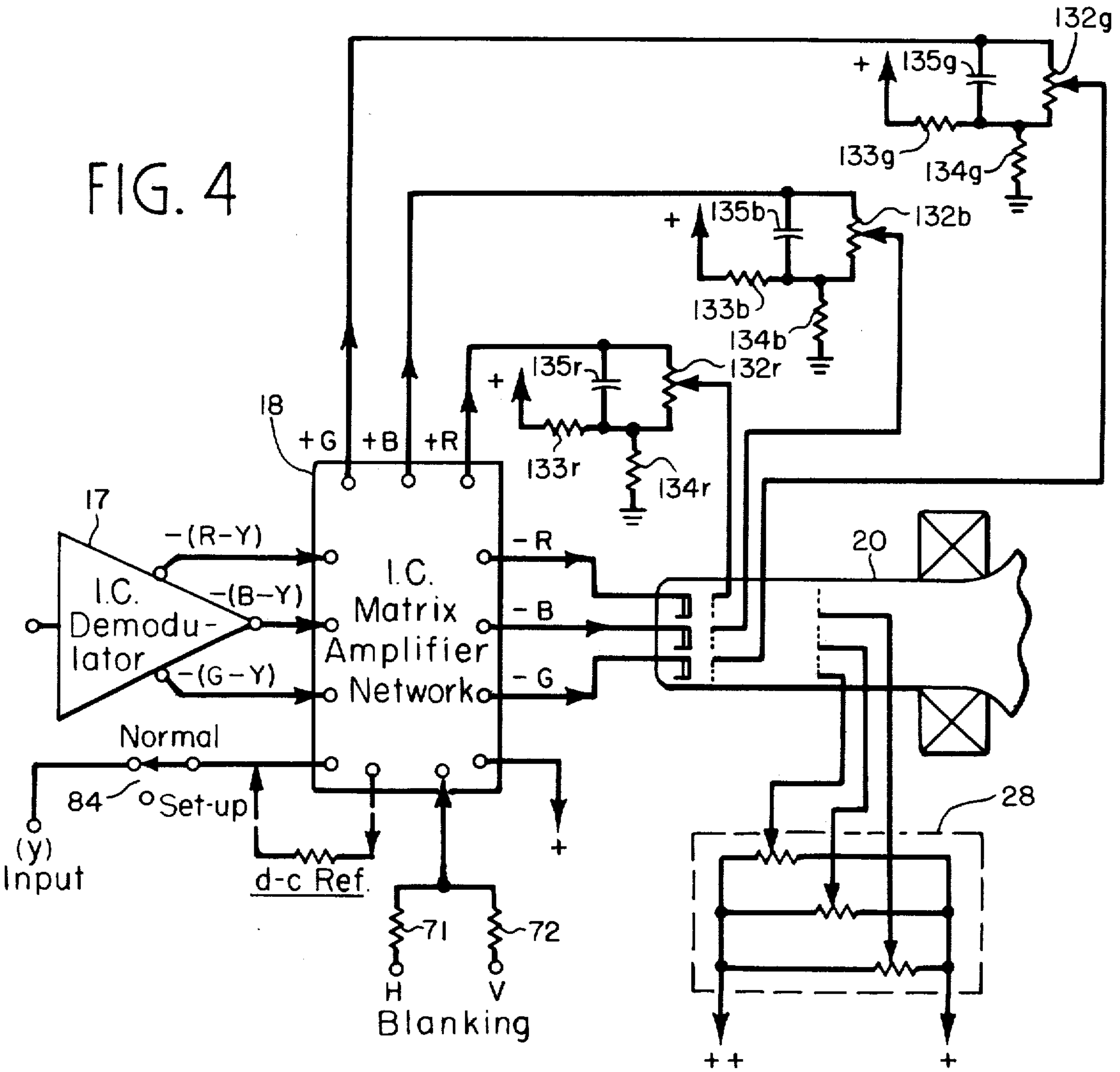
FIG. 4 shows in partial block and schematic diagram form a modification of the present invention as applicable to high level tracking for a television receiver.

It will be noted that the embodiment as shown and described for FIGS. 1, 2 and 3 pertains to a matrix amplifier network suitable for low-level tracking. FIG. 4 illustrates still another embodiment of the invention especially adapted for high-level tracking applications. In the latter embodiment, the luminance signal is applied to matrix amplifier network 18 remains fixed. That is, a given level of luminance signal is coupled to the differential amplifiers, of more particularly, to the base electrodes of transistors 31r, 31b and 31g (FIG. 2). In the embodiment illustrated in FIG. 4, the required signal or gain adjustments to obtain the correct grey scale tracking is accomplished by included potentiometers 132r, 132b and 132g interposed between the respective outputs of the matrix amplifier network 18, at which the positive primary color signals are developed, and the control grids of the image reproducer 20, as indicated. For effective set-up procedures, however, it will be realized that the particularized settings of the potentiometers 132r, 132b and 132g must not adversely affect the establishment of the necessary parameters. Such prerequisite is accomplished by the inclusion of resistors 133r–134r, 133b–134b and 133g–134g connected between a source of unidirectional potention and ground, with their respective junctions being connected to an associated end terminal of each of the potentiometers 132r, 132b or 132g remote from the output of the matrix amplifier network 18, as indicated. The respective resistive networks 133–134 maintain the associated end terminal of the gain adjustment potentiometers at substantially the same d-c potential during set-up procedures as that applied to the end terminal connected to the respective outputs of the matrix amplifier network 18. Accordingly, if both end terminals of potentiometers 132r, 132b and 132g are at the same potential, the settings of the movable center arms thereof are thus immaterial and of no effect on the potential impressed across the respective cathodes and control grids of the image reproducer 20 during set-up operations.

The described arrangements as herein set forth have the advantages inherently obtained with differential amplifiers of monolithic form, namely, rejection of common mode information or perturbations, reduced B+ voltage and power requirements, uniformity of outputs, and improved d-c stability to both power supply and warm up temperature variations. Breakdown voltage requirements are reduced to about one-half through the use of the disclosed arrangement developing push-pull forms of primary color control signals. Such a system accommodates a given potential swing in the input circuit of the controlled image reproducer with a voltage requirement which is half that of a matrix arrangement providing a single-ended output.

With the provision of the novel matrix set-up arrangement 83 or 83' as an integral part thereof, as previously described, the matrix amplifier network 18 is rendered completely impervious to variations in the input signal levels such as may be experienced by shifts in the quiescent operating parameters of the associated demodulator devices, whether the result of unit-to-unit differences or because of power supply or line voltage fluctuations as well as operating changes during warm-up time. In any event, the matrix amplifier network 18 as a whole is accordingly operable from a completely unregulated, off-the-line power supply. The same is of course true with respect to the associated demodulator devices. No corrective action or circuit adjustments are necessary as the set-up matrix arrangement 83 or 83' is self-correcting and, in that sense, automatic. The disclosed matrix set-up arrangement also insures the cancellation of the absolute d-c drift of the associated demodulator devices within an expected range of 75 to 95 percent. The monolithic amplifier network 18 with the disclosed matrix set-up circuit is readily adaptable for either low-level or high-level tracking applications.

While only particular embodiments of the invention have been shown and described herein, it will be obvious that certain modifications may be made without departing from the invention in its broader aspects and, accordingly, the appended claims are intended to cover all such changes and alternative constructions that fall within the true scope and spirit of the invention.

What is claimed is:

1. A matrix amplifier network for developing push-pull color control signals from derived luminance and three color-difference signals representing red, blue and green color fields, and for establishing and maintaining d-c parameters defining reference black level, said amplifier network comprising in combination:

three differential amplifiers each including a high impedance component and a pair of transistors each with collector, base and emitter electrodes, arranged in a Y-type configuration, with said high impedance component included in the collector-emitter paths of both of said transistor devices;

common bias means for establishing substantially the same current flow in said high impedance component of each of said amplifiers;

means for applying said luminance signal to said base electrodes of one of said pair of transistor devices in each of said amplifiers, and for applying said color-difference signals to the other of said pair of transistor devices of said amplifiers, respectively, the polarities of said applied signals being related to develop at said collectors of said pair of transistor devices of said amplifiers push-pull control signals representing the three color fields of the image being translated;

matrix circuit means for developing a substantially d-c control voltage substantially free of color-difference signal information from respective portions of said applied color-difference signals; and means for utilizing said derived control voltage to maintain a substantially constant differential in applied signal voltages as between said base electrodes of each of said transistors comprising said transistor pairs and, in turn, substantially the same output voltage at said associated collector electrodes thereof notwithstanding variations in the applied signal levels at the base electrodes of each of said other transistors in each of said transistor pairs.

2. A matrix amplifier network in accordance with claim 1 wherein said matrix circuit means include respective voltage divider means in the circuitry of each of said differential amplifiers, and a constant current source, said voltage divider means each including a resistance of a selected value connected between a respective base electrode of each of said other transistors of said transistor pairs and said common junction point, said constant current source including an additional transistor device having a base electrode coupled to said common bias means, a collector electrode coupled to said common junction point and an emitter electrode returned to a plane of reference potential.

3. A matrix amplifier network in accordance with claim 1 wherein said matrix circuit means includes respective voltage divider means in the circuitry of each of said differential amplifiers, said voltage means each including a first resistance of a selected value connected between a respective base electrode of each of said other transistors of said transistor pairs and said common junction point, and a second resistance connected between said respective base electrodes and a plane of reference potential, said matrix circuit means further including additional resistance means connected between said common junction point and said plane of reference potential.

4. A matrix amplifier network in accordance with claim 2 wherein said resistances forming said respective voltage divider means include circuit values whereby the portions of color-difference signal information coupled therethrough and applied to said common junction point are substantially of equal magnitudes which when combined forms said control voltage essentially free of color-difference signal information.

5. A matrix amplifier network in accordance with claim 2 wherein the resistance connected between said base electrode of said other transistor of the transistor pair forming the differential amplifier for developing red push-pull color control signals is of a given resistance value, the resistance connected between the base electrode of said other transistor of the transistor pair forming the differential amplifier for developing blue push-pull color control signals is of a value approximately twice that of said given resistance, and the resistance connected between the base electrode of said other transistor of the transistor pair forming the differential amplifier for developing green push-pull color control signals is between one-third and one-fourth that of said given resistance value.

6. A matrix amplifier network in accordance with claim 1 wherein said means for applying said luminance signal to said differential amplifiers comprise three potentiometers, the body portions of said potentiometers being connected in parallel and the movable contact arms being selectively connected to said base electrodes of said one transistors in respective ones of said transistor pairs, said contact arms being selectively adjustable for low-level tracking action.

7. A matrix amplifier network in accordance with claim 1 and further including means comprising a trio of potentiometers interposed as voltage dividers in respective ones of said differential amplifier output circuits for providing high-level tracking action.

8. A matrix amplifier network in accordance with claim 1 wherein said high impedance component comprises the collector-emitter path of an additional transistor device having base, collector and emitter electrodes.

9. A matrix amplifier network in accordance with claim 1 which is constructed in a monolithic circuit configuration and in which said means for deriving said push-pull color control signals comprise a pair of output connections in each of said differential amplifiers.

10. A matrix amplifier network in accordance with claim 1 which further comprises means for applying to at least one transistor in each of said transistor pairs forming said differential amplifiers a periodically recurring retrace signal of such polarity as to introduce retrace blanking components into said push-pull color control signals for blanking action during retrace intervals.

11. In a color television receiver having a plurality of demodulators for deriving color-difference signals at respective outputs thereof representative of three color fields of a televised image, a matrix circuit arrangement for neutralizing the effect of shifts in the d-c operating levels of such demodulators, including in combination:

a reference terminal;

voltage divider means interconnecting each of said demodulator outputs and said reference terminal for combining portions of said color-difference signals to form on said reference terminal a control voltage in which the color-difference information effectively cancels and only a substantially d-c component remains, said d-c control voltage being representative of variations in the d-c operating levels of said demodulators; and means connected to said reference terminal for utilizing said derived d-c control voltage.

12. In a matrix amplifier network including a plurality of differential amplifiers, each having a pair of inputs and a pair of output circuits for developing push-pull control signals, a matrix circuit arrangement for maintaining substantially fixed output signal levels at said respective differential amplifier output circuits over a given range of input signal levels, said matrix circuit arrangement including in combination:

a source of signal information coupled to a selected one of said inputs of each of said differential amplifiers;

voltage divider means connected between each of said selected ones of said differential amplifier inputs for combining portions of said applied signal information to form a substantially d-c control voltage essentially free of signal information components; and means for applying said derived control voltage to said other input of each of said differential amplifiers whereby the voltage difference between said inputs of each of said differential amplifiers remains substantially constant notwithstanding variations in the signal levels as applied to said selected ones of said differential amplifier inputs.

13. A matrix circuit arrangement for establishing and maintaining d-c set-up parameters in a color television receiver having a matrix amplifier network in monolithic form comprised of a plurality of differential amplifiers, each of which includes a pair of inputs and a pair of output circuits for developing push-pull color control signals, said matrix set-up circuit arrangement including in combination:

a source of color-difference signal information coupled to a selected one of said inputs of each of said differential amplifiers;

circuit means interconnecting each of said selected ones of said differential amplifier inputs and a common junction point for combining portions of said applied color-difference signal information to form a substantially d-c control voltage; and means for applying said d-c control voltage to said other input of each of said differential amplifiers whereby a substantially constant voltage difference is maintained between said inputs of each of said differential amplifiers notwithstanding changes within a given range in the signal levels of the color-difference information as applied to said selected ones of said differential amplifier inputs.

* * * * *